(12) United States Patent
Lee et al.

(10) Patent No.: US 9,908,159 B2
(45) Date of Patent: Mar. 6, 2018

(54) WASHING DEVICE FOR WATER TREATMENT APPARATUS AND WASHING METHOD THEREOF

(71) Applicant: Woongjin Coway Co., Ltd., Choongcheongnam-do (KR)

(72) Inventors: Jung-Hwan Lee, Seoul (KR); Jin-Seong Ka, Seoul (KR); Ho-Dong Nam, Seoul (KR); Jong-Min Kim, Seoul (KR)

(73) Assignee: Woongjin Coway Co., Ltd (KR)

( * ) Notice: Subject to any disclaimer, the term of this patent is extended or adjusted under 35 U.S.C. 154(b) by 72 days.

(21) Appl. No.: 14/817,975

(22) Filed: Aug. 4, 2015

(65) Prior Publication Data

US 2016/0030986 A1 Feb. 4, 2016

Related U.S. Application Data

(62) Division of application No. 13/322,794, filed as application No. PCT/KR2009/008011 on Dec. 31, 2009, now Pat. No. 9,139,451.

(30) Foreign Application Priority Data

May 28, 2009 (KR) .................. 10-2009-0047174

(51) Int. Cl.
*B08B 9/00* (2006.01)
*B08B 9/08* (2006.01)
(Continued)

(52) U.S. Cl.
CPC .......... *B08B 9/0856* (2013.01); *B08B 9/0321* (2013.01); *C02F 1/00* (2013.01);
(Continued)

(58) Field of Classification Search
CPC ........ C02F 1/00; C02F 1/001; C02F 2303/14; C02F 2301/066; C02F 1/44;
(Continued)

(56) References Cited

U.S. PATENT DOCUMENTS 5,310,488 A 5/1994 Hansen et al.
5,800,629 A 9/1998 Ludwig et al.
(Continued)

FOREIGN PATENT DOCUMENTS

CN 2636783 9/2004
CN 101007659 8/2007
(Continued)

OTHER PUBLICATIONS

Korean Office Action dated Jul. 27, 2015 issued in counterpart application No. 10-2011-0063783, 7 pages.
(Continued)

*Primary Examiner* — Eric W Golightly
(74) *Attorney, Agent, or Firm* — The Farrell Law Firm, P.C.

(57) ABSTRACT

A washing method of a water treatment apparatus is provided. The washing method includes a wash water inflow operation in which wash water flows into circulation members, and a circulation washing operation in which a circulation modulation circulates the wash water through passages of the water treatment apparatus.

9 Claims, 6 Drawing Sheets

(51) Int. Cl.
  *C02F 1/00* (2006.01)
  *B08B 9/032* (2006.01)
  *C02F 1/44* (2006.01)

(52) U.S. Cl.
  CPC ............... *C02F 1/001* (2013.01); *C02F 1/44* (2013.01); *C02F 2201/004* (2013.01); *C02F 2201/005* (2013.01); *C02F 2301/066* (2013.01); *C02F 2303/14* (2013.01)

(58) Field of Classification Search
  CPC ......... C02F 2201/004; C02F 2201/005; B08B 9/0856; B08B 9/0321
  USPC ...................................................... 134/22.1
  See application file for complete search history.

(56) References Cited

U.S. PATENT DOCUMENTS

| 2005/0000243 | A1 | 1/2005 | Hwang et al. |
| 2005/0082224 | A1 | 4/2005 | Glynn |
| 2010/0192976 | A1 | 8/2010 | Lee et al. |
| 2011/0120921 | A1 | 5/2011 | Kim |

FOREIGN PATENT DOCUMENTS

| DE | 102 30 738 | 1/2004 |
| JP | 63-051992 | 3/1988 |
| JP | 02-063529 | 3/1990 |
| JP | 05-092182 | 4/1993 |
| JP | 08-299923 | 11/1996 |
| JP | 2000-084572 | 3/2000 |
| JP | 2001-079362 | 3/2001 |
| JP | 2003-093992 | 4/2003 |
| JP | 2003-251290 | 9/2003 |
| JP | 2009-078208 | 4/2009 |
| KR | 19950013553 | 6/1995 |
| KR | 19970069080 | 11/1997 |
| KR | 100199339 | 6/1999 |
| KR | 10-0325096 | 4/2002 |
| KR | 1020020074638 | 10/2002 |
| KR | 200380283 | 3/2005 |
| KR | 1020060129670 | 12/2006 |
| KR | 100843313 | 7/2008 |
| KR | 1020080101588 | 11/2008 |
| KR | 1020090017920 | 2/2009 |
| KR | 100893565 | 4/2009 |
| WO | WO 98/37950 | 9/1998 |

OTHER PUBLICATIONS

Korean Office Action dated Feb. 17, 2015 issued in counterpart application No. 10-2011-0063783, 4 pages.
PCT/ISA/210 Search Report issued on PCT/KR2009/008011, (pp. 3), dated Jul. 28, 2010.
PCT/ISA/237 Written Opinion issued on PCT/KR2009/008011 (pp. 5), dated Jul. 28, 2010.

[FIG. 1]
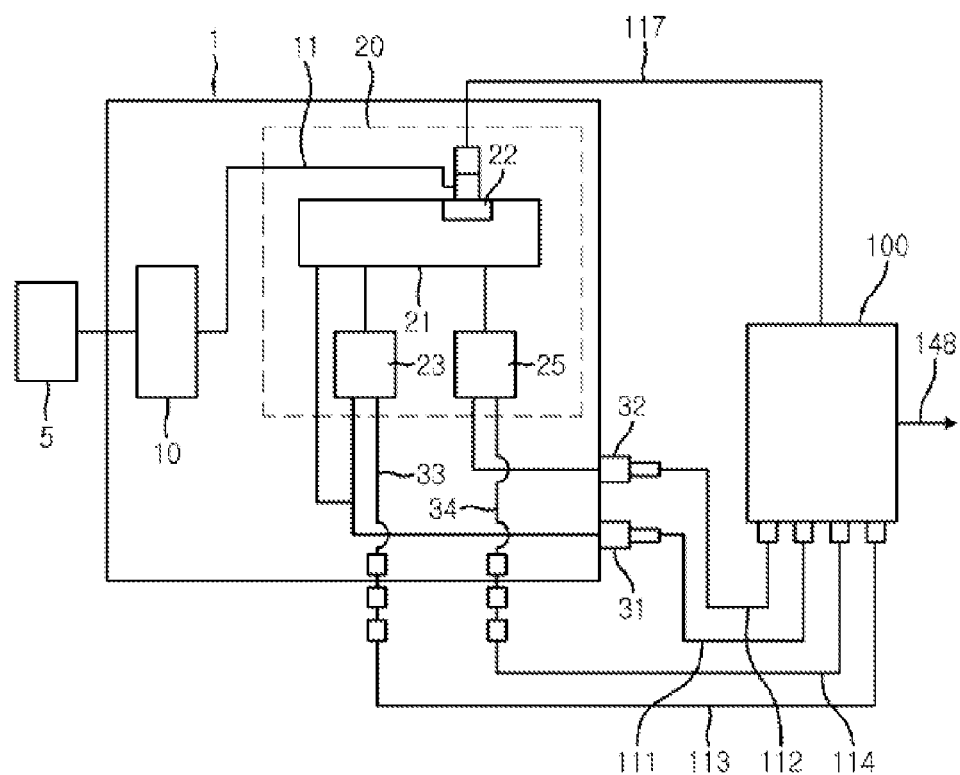

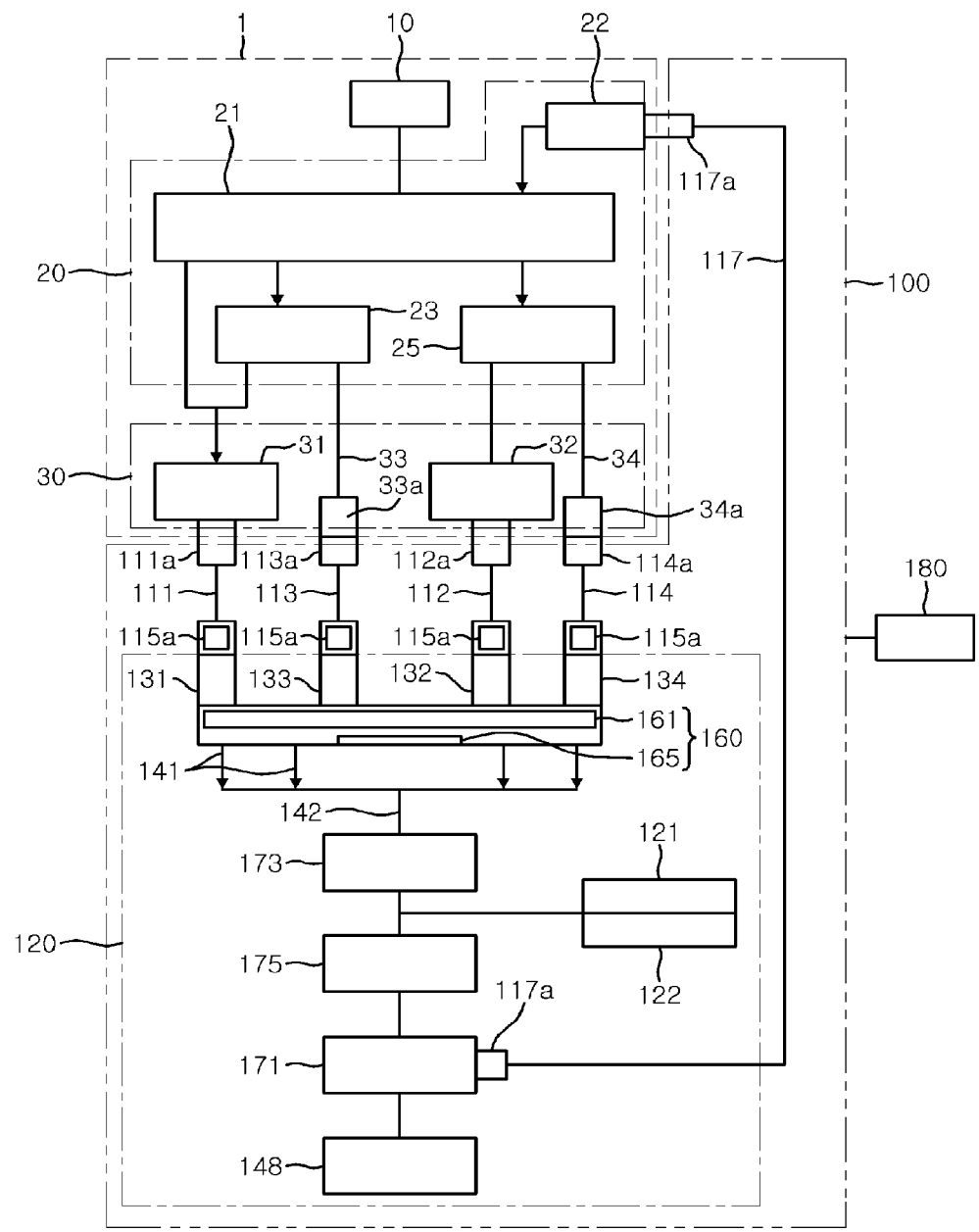
[Fig. 2]

[Fig. 3]
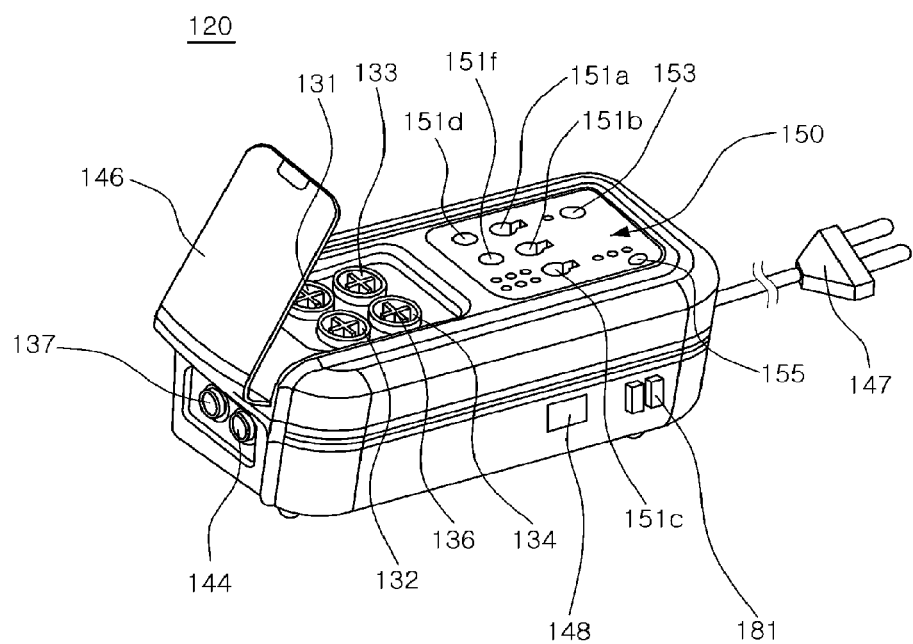

[FIG. 4]
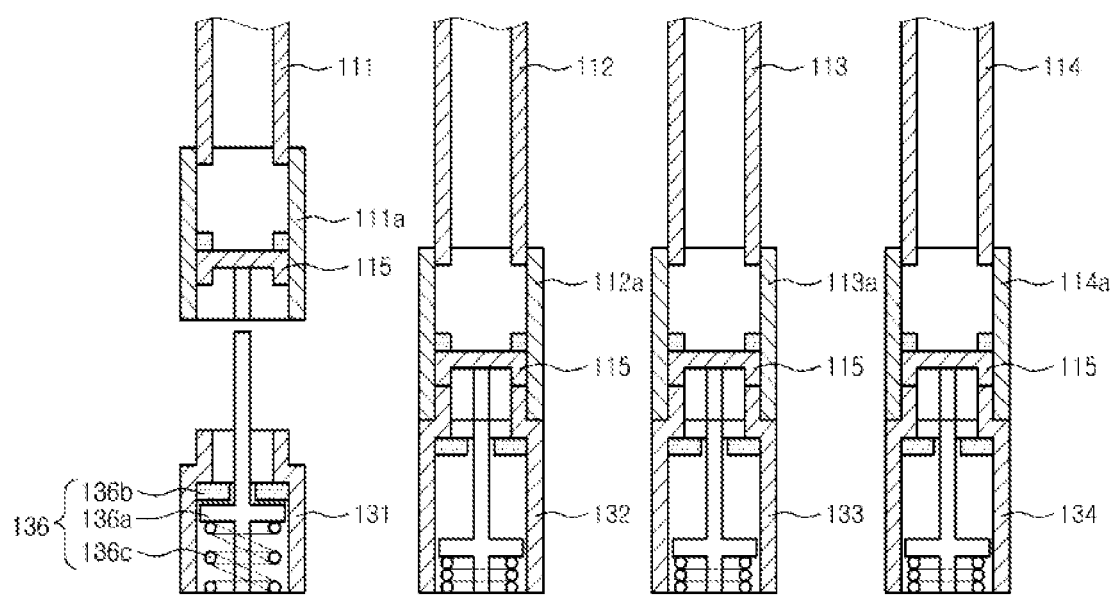

[FIG. 5]
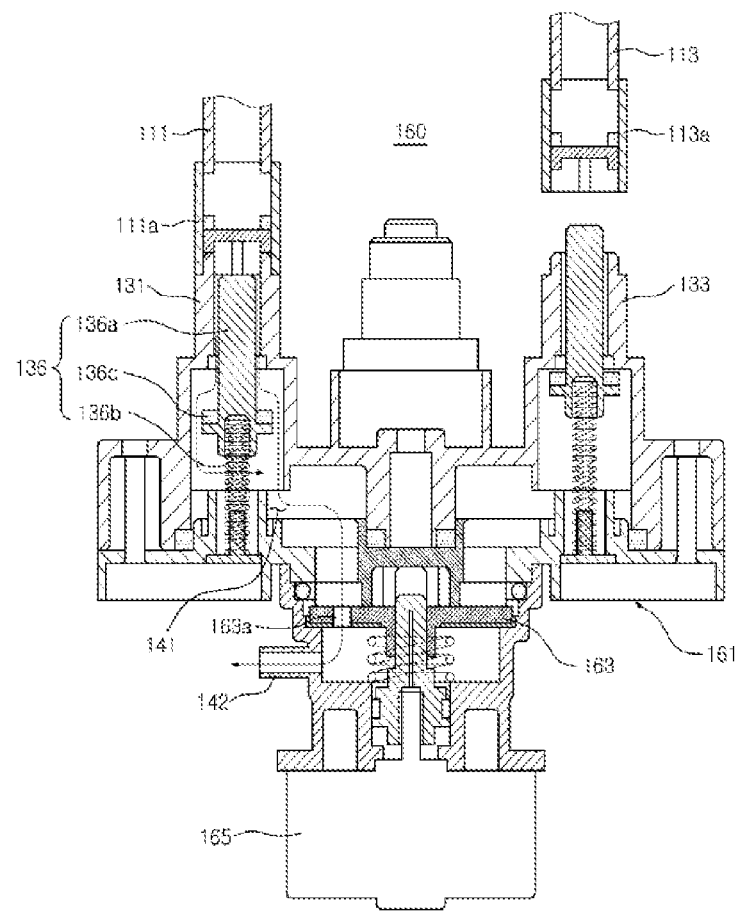
[FIG. 6]
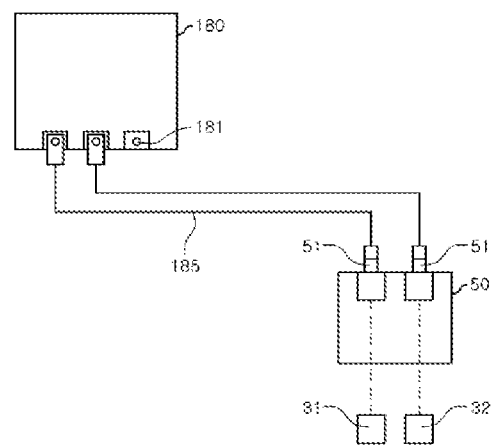

[Fig. 7]
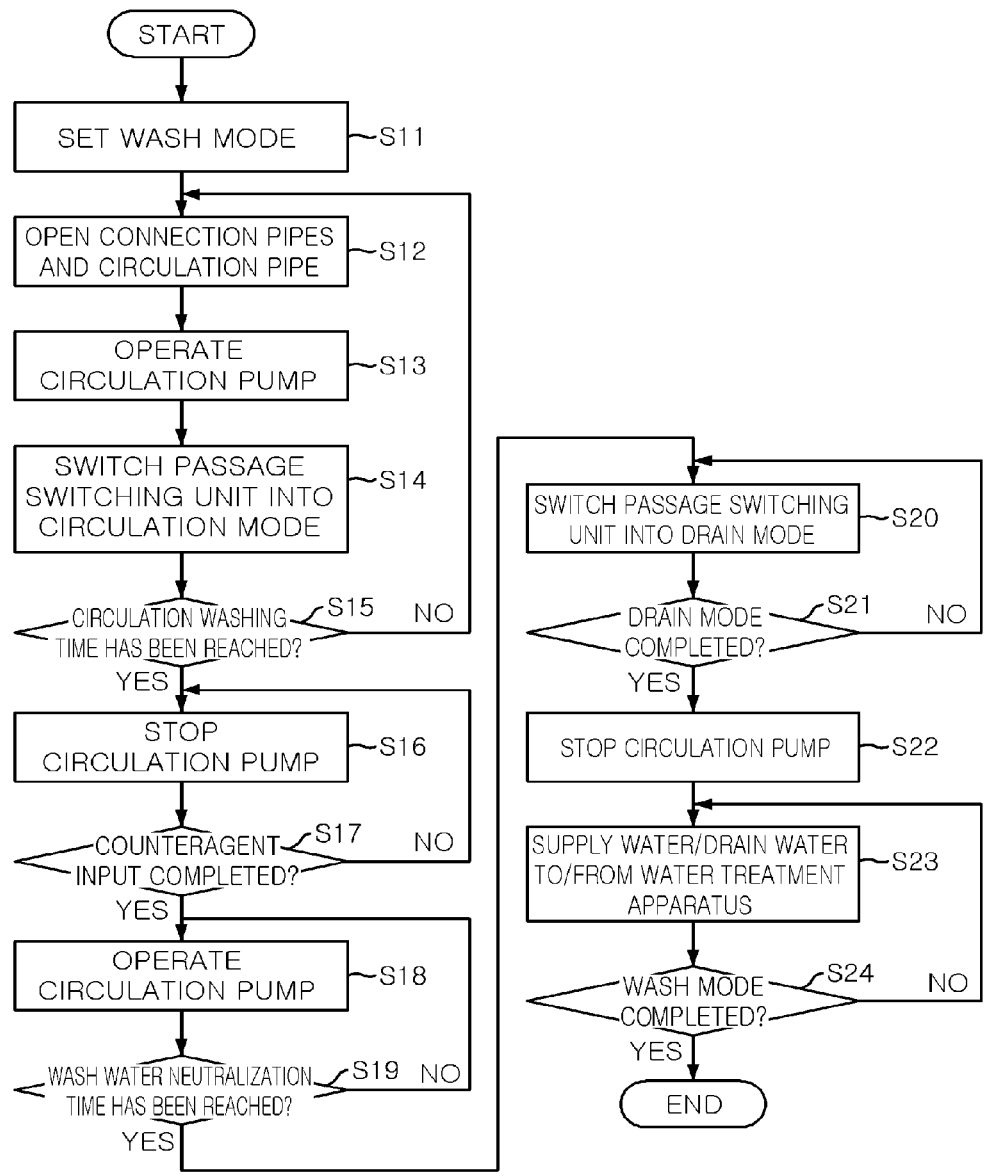

WASHING DEVICE FOR WATER TREATMENT APPARATUS AND WASHING METHOD THEREOF

This application is a Divisional Application of U.S. patent application Ser. No. 13/322,794, which was filed in the U.S. Patent and Trademark Office on Nov. 28, 2011, as a National Phase Entry of PCT International Application No. PCT/KR2009/008011, which was filed on Dec. 31, 2009, and claims priority to Korean Patent Application No. 10-2009-0047174 filed in the Korean Intellectual Property Office on May 28, 2009, and which has issued as U.S. Pat. No. 9,139,451 on Sep. 22, 2015, the content of each of which is incorporated herein by reference.

BACKGROUND OF THE INVENTION

1. Field of the Invention

The present invention relates to a washing device for a water treatment apparatus and a washing method thereof.

2. Description of Related Art

In general, a water treatment apparatus filters raw water to provide potable water.

Examples of this water treatment apparatus may include water purifiers and ionizers.

The water treatment apparatus includes a filter unit filtering water and a water cock admitting filtered water to provide potable water. Furthermore, this water treatment apparatus is divided into a tank type water treatment apparatus that has a purified water tank in which purified water is stored, a cold water tank, and a hot water tank, or a tank type water treatment apparatus that has part of these water tanks, and a tankless type water treatment apparatus that does not have any of these water tanks.

The filter unit, the water cock, and the various tanks of the water treatment apparatus are connected through purified water pipes so that purified water can flow therethrough.

When the water treatment apparatus is used for a long period of time, the tanks, the water cock and the various purified water pipes become covered with foreign substances contained in water. Therefore, a user or a coordinator of the water purifier cleans the inside of each tank periodically or upon necessity.

However, in the related art, cleaning cannot be easily undertaken because it may be impossible to insert cleaning tools into long, narrow passages of the various purified water pipes or the water cock or to reach them with hands. Therefore, even after the water treatment apparatus is cleaned, the user cannot help drinking water contaminated with foreign substances from within the water cock or the various purified water pipes.

SUMMARY

The present invention has been made to solve the foregoing problems of the related art and therefore an aspect of the present invention is to provide a washing device for a water treatment apparatus and a washing method thereof that can wash hard to reach areas of the water treatment apparatus with washing tools or hands.

According to an aspect of the present invention, there is provided a washing device for a water treatment apparatus, the washing device including: circulation members connected to passages of the water treatment apparatus to circulate wash water through the passages of the water treatment apparatus; and a circulation module connected to the circulation members and circulating the wash water through the passages of the water treatment apparatus and the circulation members to thereby wash the passages of the water treatment apparatus.

The circulation members may include: one or more connection pipes connected to a drain unit of the water treatment apparatus; and a circulation pipe connected to an outlet side of a filter unit of the water treatment apparatus.

The connection pipes may be detachably coupled to cocks and/or drainpipes forming the drain unit, and the circulation pipe may be detachably coupled to a purified water pipe at the outlet side of the filter unit or a purified water storage unit.

The circulation pipe may be connected to a water level controller detecting a water level of the purified water storage unit when the circulation pipe is coupled to the purified water storage unit.

Mesh nets may be provided to the connection pipes or the circulation pipe in order to filter the wash water.

The circulation module may comprises an opening/closing device sequentially opening the passages communicating with the connection pipes to thereby sequentially circulate the wash water through the passages.

The opening/closing device may include a housing having a plurality of connection ports to which the connection pipes are detachably coupled; a disc having an opening corresponding to the connection ports; and a motor opening the corresponding connection ports as the opening corresponds to the corresponding connection ports by rotating the disc.

Check valves may be separately provided in the individual connection ports to open the connection ports when the connection pipes are connected to the connection ports and close the connection ports when the connection pipes are not connected thereto.

The housing of the opening/closing device may include a plurality of connection passages connected to the respective connection ports and an integrated passage connecting the connection passages into a single passage and connected to the circulation pipe.

The opening/closing device may be a plurality of solenoid valves separately provided in the connection ports coupled to the respective connection pipes.

The circulation module further may further comprise an operating unit determining the number of the connection ports according to the number of cocks and the number of drainpipes of the water treatment apparatus.

Connection ports may be provided at an upper surface of the circulation module so that the connection pipes are coupled to the connection ports, and a circulation port may be provided at a side surface of the circulation module so that the circulation pipe is coupled to the circulation port.

The circulation module may include drainpipes connected to the circulation members; a passage switching unit connected to a portion where the circulation members are coupled to the drainpipes to thereby switch a passage of the wash water; and a circulation pump connected to the circulation members to selectively flow the wash water in the connection pipes through the passages or the drainpipes of the water treatment apparatus.

The circulation module may further comprise a wash water detection unit measuring a flow of the wash water and determining whether the circulation module operates normally or not.

The wash water detection unit may be arranged at a wash water outlet side of the circulation pump of the water treatment apparatus.

The wash water detection unit may be a hydraulic sensor or a flow rate sensor.

According to another aspect of the present invention, there is provided a washing method of a water treatment apparatus, the washing method including: a wash water flow operation in which wash water flows into circulation members; and a circulation washing operation in which a circulation modulation is operated to circulate the wash water through passages of the wash treatment apparatus.

The wash water may circulate through an outlet side of a filter unit of the wash treatment apparatus in the circulation washing operation.

A plurality of passages of the water treatment apparatus are divided into groups comprising at least one passage, and the wash water circulates through the groups in a sequential manner to thereby wash the plurality of passages in the wash water flow operation.

A plurality of tanks of the water treatment apparatus are divided into groups comprising at least one tank, and the wash water circulates through the groups in a sequential manner to thereby wash the plurality of tanks in the wash water flow operation.

The circulation module may be operated before a purified water storage unit at the outlet side of the filter unit is fully filled with water in the circulation washing operation.

Malfunction may be detected by measuring a hydraulic pressure or a flow rate of the wash water in the circulation washing operation.

The circulation module may stop operating when the circulation washing operation is completed or malfunction is detected in the circulation washing operation.

Washing completion or malfunction may be indicated through a display and/or a buzzer when the circulation module stops operating in the circulation washing operation.

The washing method may further include a wash water neutralization operation in which the wash water is neutralized by inputting a counteragent into the wash water after the circulation washing operation.

A plurality of passages of the water treatment apparatus may be divided into groups comprising at least one passage, and the wash water circulates through the groups in a sequential manner to thereby wash the plurality of passages in the wash water neutralization operation.

Completion of neutralizing the wash water may be indicated using a display and/or a buzzer when the wash water neutralization operation is performed for a predetermined period of time.

The washing method may further include a draining operation in which neutralized wash water is drained off by operating the passage switching unit after the wash water neutralization operation is performed for the predetermined period of time.

The washing method may further include a cleaning operation in which the passages of the water treatment apparatus are cleaned by supplying purified water to the passages of the water treatment apparatus and draining off the purified water after the draining operation is performed.

The passage switching unit may be operated after completely filling the purified water storage unit at the outlet side of the filter unit with the purified water to thereby drain off the purified water in the purified water storage unit to the outside in the cleaning operation.

As described above, according to the present invention, areas hard to reach with washing tools or hands can also be easily washed.

According to the present invention, passages of the water treatment apparatus can be prevented from not being partially washed or a reduction in washing efficiency can be prevented due to water pressure differences therebetween.

According to the present invention, malfunction can be accurately detected during washing, and noise reduction cab be achieved.

BRIEF DESCRIPTION OF DRAWINGS

FIG. 1 is a block diagram illustrating a water treatment apparatus and a washing device according to an exemplary embodiment of the present invention;

FIG. 2 is a block diagram illustrating the configuration of the washing device of FIG. 1;

FIG. 3 is a perspective view illustrating the washing device of FIG. 2;

FIG. 4 is a development view illustrating a coupling relationship between connection pipes and connection ports forming the washing device of FIG. 3;

FIG. 5 is a configuration view illustrating one example of an opening/closing device of the washing device of FIG. 2;

FIG. 6 is a configuration view illustrating how a control unit of the washing device of FIG. 2 and a control unit of a water treatment apparatus are connected through power supply cables; and FIG. 7 is a flowchart illustrating a washing method of a washing device according to an exemplary embodiment of the present invention.

DETAILED DESCRIPTION OF EMBODIMENTS OF THE PRESENT INVENTION

Exemplary embodiments of a washing device for a water treatment apparatus according to the present invention will now be described in detail.

A washing device for a water treatment apparatus according to the present invention can be applied to a tank type water purifier and a tankless type water purifier. A description will be made, by way of example, to a washing device installed in a tank type water purifier.

FIG. 1 is a block diagram illustrating a water treatment apparatus and a washing device according to an exemplary embodiment of the present invention.

Referring to FIG. 1, the washing device for a water treatment apparatus washes a passage inside the water treatment apparatus by circulating wash water through the water treatment apparatus.

First, an example of a water treatment apparatus 1 to which a washing device 100 is applied according to the present invention will now be described.

The water treatment apparatus 1 includes a filter unit 10 to filter water flowing from a water pipe 5 or a replaceable water tank for a dispenser. Examples of the filter unit 10 may include a sediment filter, a pre-carbon filter, a membrane filter, and a post-carbon filter.

The above sediment filter uses nonwoven fabric to filter foreign substances and suspended solids in raw water. The pre-carbon filter uses surface activated carbons to remove chlorine or odors from raw water. The membrane filter filters raw water by passing the raw water through a porous membrane using a cellulose-based composition fiber. The post-carbon filter has greater absorption than the surface activated carbons to remove color and odors.

The water treatment apparatus 1 includes a purified water storage unit 20 in which purified water filtered through the filter unit 10 is stored. The purified water storage unit 20 may include a purified water tank 21, a hot water tank 25, and a cold water tank 23. The purified water, filtered through the filter unit 10, is stored in the purified water tank 21. The purified water discharged from the purified water tank 21 flows into the hot water tank 25 and the cold water tank 23. Alternatively, the purified water storage unit 20 only may include the cold water tank 23 and the hot water tank 25.

A cooler (not shown) that cools purified water may be installed in the cold water tank 23, while a heater (not shown) that heats purified water may be installed in the hot water tank 25.

A water level controller 22 that measures the water level when purified water passes may be installed at an inlet side of the purified water storage unit 20. Here, the water level controller 22 is disposed at a purified water inlet side of the purified water tank 21 so that the purified water, discharged from the filter unit 10, flows into the purified water tank 21. The water level controller 22 detects the water level of the purified water tank 21 as the purified water passes, and blocks the flow of the purified water when the purified water tank 21 is filled with water.

The purified water storage unit 20 is connected to a drain unit 30 through purified water pipes. The drain unit 30 may include a cold/purified water cock 31 connected to the purified water tank 21 and the cold water tank 23, a hot water cock 32 connected to the hot water tank 25, and drainpipes 33 and 34 draining off water in the cold water tank 23 and the hot water tank 25, respectively, to the outside.

Here, the cold water/purified water cock 31 may be connected to a single purified water pipe into which the purified water pipe, connected to the purified water tank 21, and the purified water pipe, connected to the cold water tank 23, are connected. Furthermore, the hot water cock 32 may be connected to the purified water pipe connected to the hot water tank 25. In addition, opening/closing members 33a and 34a may be installed at the outlet sides of the drainpipes 33 and 34, respectively, so that the opening/closing members 33a and 34a are automatically opened as connection pipes 113 and 114 of the washing device 100 to be described below are coupled thereto.

The cold water/purified water cock 31 and the hot water cock 32 may include levers (not shown) to manually open or close passages inside the cocks 31 and 32, respectively. Here, when the respective levers are pressed, the individual cocks 31 and 32 may be separately opened. When the respective levers are released, the respective passages of the cocks 31 and 32 may be each closed.

Furthermore, the cold water/purified water cock 31 and the hot water cock 32 may include electronic valves (not shown) in order to electromagnetically open or close the passages of the cocks 31 and 32, respectively. As for the electronic valves, solenoid valves are proposed.

When the electronic valves are used for the cold water/purified water cock 31 and the hot water cock 32 of the water treatment apparatus 1, connection terminals 51 (refer to FIG. 6) are installed on a control unit 50 (refer to FIG. 6) of the water treatment apparatus 1 in order to supply power to the electronic valves. The connection terminals 51 of the control unit 50 are detachably coupled to connection terminals of wires (not shown) supplying power to the electronic valves.

The washing device for the water treatment device will now be described.

FIG. 2 is a block diagram illustrating the configuration of a washing device according to an exemplary embodiment of the invention. FIG. 3 is a perspective view illustrating the washing device of FIG. 2.

Referring to FIGS. 2 and 3, the washing device 100 includes circulation members 111 to 114 and 117 and a circulation module 120.

The circulation members 111 to 114 and 117 are connected to the passages of the water treatment apparatus so that wash water can circulate through the passages of the water treatment apparatus 1. The circulation members 111 to 114 and 117 form an infinite loop, together with the passages of the water treatment apparatus.

The circulation members 111 to 114 and 117 may include one or more connection pipes 111 to 114 that are connected to the drain unit 30 of the water treatment apparatus 1, and a circulation pipe 117 connected to an outlet side of the filter unit 10 of the water treatment apparatus.

The number of connection pipes 111 to 114 may be large enough to be connected to drainage structures including the drainpipes 33 and 34 and the cocks 31 and 32 of the water treatment apparatus 1. As for a water treatment apparatus having a small number of drainage structures, some of the connection pipes 111 to 114 may be connected to the drainage structures and others may not be connected to the drainage structures.

The connection pipes 111 to 114 may be detachably connected to the cocks 31 and 32 and/or the drainpipes 33 and 34 constituting the drain unit 30. Here, fitting devices or connectors 111a to 114a may be coupled to one set of ends of the connection pipes 111 to 114 so that the connection pipes 111 to 114 can be detachably connected to the cocks 31 and 32 and the drainpipes 33 and 34. In addition, connectors 111a to 114a may be connected to the other set of ends of the connection pipes 111 to 114, respectively, so that the connection pipes 111 to 114 can be detachably connected to the connection ports 131 to 134 of the circulation module 120, respectively.

After the connectors 111a to 114a are connected to the cocks 31 and 32 and the drainpipes 33 and 34, the connectors 111a to 114a can be easily separated from the cocks 31 and 32 and the drainpipes 33 and 34 by pulling or pushing the connectors 111a to 114a. These connectors 111a to 114a may be configured in various ways.

The circulation pipe 117 may be connected to the outlet side of the filter unit 10. For example, the circulation pipe 117 may be detachably coupled to a purified water pipe 22 of the outlet side of the filter unit 10 or the purified water tank 21 in the purified water storage unit 20. Here, connectors 117a having the same configuration as the connectors 111a to 114a of the connection pipes 111 to 114 may be provided on both ends of the circulation pipe 117.

After the filter unit 10 is separated from the water treatment apparatus 1, the connectors 117a of the circulation pipe 117 may be connected to a purified water pipe 22 of the outlet side of the filter unit 10. Here, the purified water pipe 22 of the outlet side of the filter unit refers to a purified water pipe connecting the filter unit 10 and the purified water tank 21 to each other.

Furthermore, the connectors 117a of the circulation pipe 117 may be connected to the water level controller 22 after the water level controller 22 of the purified water storage unit 20 is separated from the purified water pipe.

Mesh nets 115 may be provided in the connection pipes 111 to 114 or the circulation pipe 117 to filter wash water. The mesh nets 115 have meshes that do not apply much water pressure of the wash water to the connection pipes 111 to 114 and the circulation pipe 117. As show in FIG. 2, the mesh nets 115 are provided in the connectors 111*a* to 114*a* of connection pipes 111 to 114. However, the mesh nets 115 may be installed in the connection pipes and the circulation pipe.

Here, the mesh nets 115 may be detachably coupled to the connectors 111*a* to 114*a* provided on the other set of ends of the connection pipes 111 to 114. Therefore, before installing the connection pipes 111 to 114 in the water treatment apparatus 1 or after separating the connection pipes 111 to 114 therefrom, it is easy to wash the mesh nets 115 clean or replace the mesh nets 115 with new ones.

The connection pipes 111 to 114 may be long enough to be connected to the cocks 31 and 32/drainpipes 33 and 34 and the circulation module 120 disposed in the water treatment apparatus 1 when the circulation module 120 is laid on the ground. Furthermore, the circulation pipe 117 may be long enough to be connected to the purified water tank 21 or the outlet purified water pipe 22 of the outlet side of the filter unit 10 disposed at an upper part of the water treatment apparatus 1 when the circulation module 120 is laid on the ground. Therefore, the circulation pipe 117 may be relatively longer than the connection pipes 111 to 114.

The circulation module 120 may include a detergent inlet 121 and a counteragent inlet 122 through which detergent and a counteragent are introduced. The detergent inlet 121 and the counteragent inlet 122 may be connected to a wash water inlet or outlet side of the circulation pump 173. Therefore, the detergent and the counteragent are introduced into areas having high fluidity in the circulation module 120, so that the detergent and the counteragent can be mixed with purified water in a short period of time.

Alternatively, without installing the detergent inlet 121 and the counteragent inlet 122 in the circulation module 120, a user or a coordinator may directly inject detergent or a counteragent into the passage of the purified water tank 21 or the circulation module 120.

As for the detergent, various chemicals capable of cleaning and sterilizing the inner surface of the water treatment apparatus may be used. In addition, as for the counteragent, appropriate chemicals need to be used according to the composition of the detergent.

As an example of the detergent, a detergent, as disclosed in Korean Patent Publication No. 10-2006-0129670, may be applied. There is disclosed a washing method including performing primary cleaning using a first cleaning solution containing chlorine dioxide and performing secondary cleaning using a second cleaning solution containing ammonium ions and hydroxyl ions. According to an exemplary embodiment of the present invention, different types of detergent as well as the above-described detergent can be used.

Two or more connection ports 131 to 134 connected to the connection pipes 111 to 114, respectively, and one circulation port 137, connected to the circulation pipe 117, may be formed in the circulation module 120. Here, the connection ports 131 to 134 are detachably connected to the connectors 111*a* to 114*a* of the connection pipes 111 to 114, respectively, and the circulation port 137 is detachably connected to the connector 117*a* of the circulation pipe 117.

The connection ports 131 to 134 may be formed on an upper surface of a case of the circulation module 120. Therefore, while the circulation module 120 is laid on the ground, it is possible to easily couple the connectors 111*a* to 114*a* of the connection pipes 111 to 114, respectively, above the connection ports 131 to 134. Furthermore, it is possible to visually check whether the plurality of connection pipes 111 to 114 are normally connected to the connection ports 131 to 134, respectively.

The circulation port 137 may be formed on the side of the case of the circulation module 120. Therefore, the circulation module 120 may be laid on the ground after the connectors 117*a* of the circulation pipe 117 are coupled to the circulation port 137 of the circulation module 120.

The circulation module 120 may include a plurality of connection passages 141, connected to the connection ports 131 to 134, respectively, and an integrated passage 142 integrating the connection passages 141 into a single passage so as to be connected to the circulation port 137. The connection passages 141 branch off from the integrated passage 142. The connection passages 141 and the integrated passage 142 may be formed in an opening/closing device 160 to be described below.

In addition, in the circulation module 120, a drain port 144 may be formed at a portion where the integrated passage 142 and the circulation port 137 are connected to each other.

A cover 146 may be provided in the circulation module 120 in order to open or close the top of the connection ports 131 to 134. The cover 146 prevents the ingress of foreign substances into the connection ports 131 to 134.

A power cord 147 may be connected to the circulation module 120 to supply power to the circulation module 120 from an external power source. A switch 148 may be provided on the circulation module 120 in order to turn the circulation module 120 on or off.

The opening/closing device 160 may be provided in the circulation module 120. The connection pipes 111 to 114 are detachably coupled to the opening/closing device 160. The opening/closing device 160 opens the passages communicating with the connection pipes 111 to 114 in a sequential manner. The passages are divided into groups comprising at least one passage, and the wash water circulates through the groups in a sequential manner to thereby wash the passages. This opening/closing device 160 will be described in detail below.

The circulation module 120 may further include a operating unit 150 in order to determine the number of connection ports 131 to 134 according to the cocks 31 and 32 and the drainpipes 33 and 34 of the water treatment apparatus 1. Here, information about the number of cocks 31 and 32 and the number of drainpipes 33 and 34 may be visualized on a display panel 153 of the operating unit 150.

Therefore, when a user or a coordinator inputs the number of cocks 31 and 32 and the number of drainpipes 33 and 34 by using the operating unit 150, the control unit 180 of the circulation module 120 controls the opening/closing device 160 to sequentially open groups into which the cocks 31 and 32 and the drainpipes 33 and 34 are divided with each group including at least one so that groups into which passages inside the water treatment apparatus 1 are divided with each group including one passage may be washed in a sequential manner.

For example, the cold water tank 23, the drainpipe 33 of the cold water tank 23, the drainpipe 34 of the hot water tank 25, and the hot water tank 25 may be sequentially washed. Furthermore, after the cold water tank 23 and the drainpipe 33 are washed at the same time, the hot water tank 25 and the drainpipe 34 may then be washed at the same time.

In addition, although not shown in the drawings, an engagement detection sensor (not shown) may be provided in the connection ports 131 to 134 of the circulation module 120 in order to determine whether the connection pipes 111 to 114 are coupled thereto or not. Here, when the connection pipes 111 to 114 are coupled to the connection ports 131 to 134, respectively, the control unit 180 of the circulation module 120 may determine to which connection ports 131 to 134 the connection pipes 111 to 114 are connected. The control unit 180 of the circulation module 120 controls the opening/closing device 160 to open groups into which the connection ports 131 to 134 coupled to the connection pipes 111 to 114 are divided with each group including at least one connection port, so that groups into which the passages inside the water treatment apparatus 1 are divided with each group including at least one passage may be opened in a sequential manner.

When the coupling detection sensor is provided in the connection ports 131 to 134 of the circulation module 120, the number of cocks 31 and 32 and the number of drainpipes 33 and 34 may not to be input using the operating unit 150.

Buttons 151a to 151f in association with the number of cocks 31 and 32 and the number of drainpipes 33 and 34, circulation wash, wash water neutralization, wash water drainage, and batch wash may be formed on the operating unit 150 of the circulation module 120. A mechanical or touchpad type may be applied to the buttons 151a to 151f.

The display panel 153 or a buzzer 155 may be provided in the operating unit 150 in order to display an error message in relation to wash water or indicate an error message with an alarm. Here, an LED or a liquid crystal display panel may be used as the display panel 153.

The circulation module 120 may include a wash water drainpipe 148 connected to the circulation members 111 to 114 and 117, the passage switching unit 171 coupled to a portion where the wash water drainpipe 148 and the circulation members 111 to 114 and 117 are connected to thereby switch the passage of wash water, and the circulation pump 137 connected to the circulation members to flow the wash water through the passages of the water treatment apparatus 1 or through the wash water drainpipe 148.

Here, the wash water drainpipe 148 is connected to the portion where the connection pipes 111 to 114 and the circulation pipe 117 are connected to each other. The passage switching unit 171 may be coupled to a portion where the connection pipes 111 to 114, the circulation pipe 117, and the wash water drainpipe 148 are connected to each other. The circulation pump 137 may be connected to the connection pipes 111 to 114 or the circulation pipe 117.

The wash water drainpipe 148 may be detachably coupled to the drain port 144 of the circulation module 120. Here, the wash water, discharged from the circulation module 120, is discharged into a sink or a drain through the wash water drainpipe 148.

As for the passage switching unit 171, a three-way valve is provided to selectively allow wash water, introduced into the connection pipes 111 to 114, to flow through the circulation pipe 117 or the wash water drainpipe 148.

The circulation pump 173 may have an impeller (not shown) and a pumping motor (not shown) therein.

The circulation module 120 may further include a wash water detection unit 175 that measures the flow of the wash water to determine whether the circulation module 120 operates normally or not. Here, as for the wash water detection unit 175, a hydraulic sensor or a flow rate sensor may be used.

The wash water detection unit 175 may be disposed at the wash water outlet side of the circulation pump 173 for the following reasons.

The circulation pump 173 may not operate normally or the opening/closing device 160 may not completely open the passages of the connection ports 131 to 134. Here, sufficient water pressure may not be applied to the wash water outlet side of the circulation pump 173. Therefore, by providing the wash water detection unit 175 at the wash water outlet side, it is possible to accurately determine whether the opening/closing device 160 and the circulation pump 173 are operated normally or not.

FIG. 4 is a development view illustrating connection pipes and connection ports forming a washing device.

Referring to FIG. 4, check valves 136 may be separately provided in the individual connection ports 131 to 134 of the circulation module 120. The check valves 136 open the passages of the connection ports 131 to 134 when the connection pipes 111 to 114 are connected. On the other hand, the check valves 136 close the passages of the connection ports 131 to 134 when the connection pipes 111 to 114 are not connected.

Here, each of the check valves 136 may include an opening/closing member 136a in each of the connection ports 131 to 134, a spring 136b elastically supporting the opening/closing member 136a, and a packing 136c coupled to the upper surface of the opening/closing member 136a to close each of the connection ports 131 to 134 while the opening/closing member 136a is lifted.

When the connection pipes 111 to 114 are coupled to the connection ports 131 to 134, respectively, the mesh nets 115 of the connection pipes 111 to 114 pressurize the opening/closing members 136a of the connection ports 131 to 134 to thereby open the passages of the connection ports 131 to 134. Here, wash water can pass through the passages of the connection ports 131 to 134.

On the other hand, when the connection pipes 111 to 114 are not coupled to the connection ports 131 to 134, respectively, the opening/closing members 136a of the check valves 136 are not pressurized, and the passages of the connection ports 131 to 134 are thus closed. Here, the check valves 136 can prevent air inflow through the connection ports 131 to 134 by an interaction between the spring 136b and the packing 136c.

FIG. 5 is a view illustrating the configuration of an example of an opening/closing device of a washing device.

Referring to FIG. 5, the opening/closing device 160 may include a housing 161, a disc 163, and a motor 165.

The housing 161 may include the plurality of connection ports 131 to 134 coupled to the connection pipes 111 to 114, respectively, a plurality of connection passages 141 separately commutating with the individual connection ports 131 to 134, and an integrated passage 142 communicating with the connection passages 141.

An opening 163a may be formed in the disc 163 so that the opening 163a corresponds to the connection passages 141 of the housing 161.

The motor 165 opens the corresponding connection ports 131 to 134 as the opening 163a corresponds to the connection passages 141 of the connection ports 131 to 134 upon rotation of the disc 163. As for the motor 165, a stepping motor that rotates a disc by every predetermined angle is proposed.

As for this disc-type opening/closing device 160, a single motor 165 is used, thereby reducing the manufacturing costs and weight of the washing device 100.

In addition, when the connection pipe 113 is not coupled to the connection port 133 of the connection ports 131 to 134, the opening/closing member 136a of the check valve 136 is not pressurized. As a result, the passage of the connection port 133 is closed.

Here, the check valves 136 can prevent air inflow through the connection port 133 by an interaction between the spring 136b and the packing 136c. Therefore, it is possible to prevent air from being sucked into the opening/closing device 160 through the connection port 133 to which the connection pipe 113 is not coupled. In addition, since the disc 163 of the opening/closing device 160 closes the connection port 133 to which the connection pipe 113 is not coupled, the connection port 133 to which the connection pipe 113 is not coupled is double blocked to thereby prevent air inflow.

Therefore, the formation of bubbles in the wash water of the opening/closing device 160 is minimized, so that the circulation pump 173 can normally pump the wash water, and the water pressure of the wash water can be kept constant. Therefore, pumping noise made when the circulation pump 173 pumps the wash water can be reduced.

Furthermore, by minimizing the formation of bubbles in the wash water in the opening/closing device 160, the wash water detection unit 175, disposed at the outlet side of the opening/closing device 160, can accurately detect the hydraulic pressure or the flow rate of the wash water.

Furthermore, as the formation of bubbles in the wash water of the circulation pump 173 or the circulation pipe 117 is minimized, noise made when the wash water flows through the circulation pipe 117 can be reduced. In addition, washing performance can also be improved.

Meanwhile, though not shown in the drawings, the opening/closing device 160 may include a plurality of solenoid valves separately provided in the individual connection ports 131 to 134. Here, as power is applied to the circulation module 120, the solenoid valves open or close the passages of the connection ports 131 to 134.

As this solenoid type opening/closing device uses a plurality of solenoid valves, it is possible to accurately control the opening and closing of each of the connection ports 131 to 134.

FIG. 6 is a view illustrating the configuration in which a control unit of a washing device and a control unit of a water treatment apparatus are connected to each other through power supply cables.

Referring to FIG. 6, connection terminals 181 may be formed at the circulation module 120 so as to be connected to the electronic valves of the water treatment apparatus 1 through the power supply cables 185. Therefore, when one set of terminals of the power supply cables 185 are connected to the connection terminals 181 of the circulation module 120, and the other set of terminals of the power supply cables 185 are connected to the connection terminals 51 of the water treatment apparatus 1, power is supplied to the cocks 31 and 32 of the water treatment apparatus 1 through the power supply cables 185, thereby opening or closing the cocks 31 and 32 of the water treatment apparatus 1.

Therefore, the washing device 100 can be used in both a case in which the cocks 31 and 32 of the water treatment apparatus 1 are manually opened or closed and a case in which the cocks 31 and 32 of the water treatment apparatus 1 are automatically opened or closed.

A process of installing the washing device for a water treatment apparatus, which has the above-described configuration according to the exemplary embodiment of the invention, in a water treatment apparatus will now be described.

Referring to FIG. 2, when the water treatment apparatus 1 needs to be washed, a power plug (not shown) of the water treatment apparatus 1 is pulled out to cut off power supply.

When the hot water tank 25 of the water treatment apparatus 1 is filled with hot water, the hot water cock 32 is opened to completely drain off the hot water. In this way, the user or the coordinator can be prevented from being burned with the hot water when connecting the washing device 100 to the water treatment apparatus 1.

Referring to FIGS. 3 and 4, the one set of ends of the connection pipes 111 to 114 are respectively coupled to the cold water/purified water cock 31, the hot water cock 32, and the drainpipes 33 and 34 of the water treatment apparatus 1, while the other set of ends of the connection pipes 111 to 114 are coupled to the connection ports 131 to 134 of the circulation module 120. Here, the mesh nets 115 of the connection pipes 111 to 114 pressurize the corresponding check valves 136, the passages of the connection ports 131 to 134 are opened (refer to FIG. 4). Furthermore, the connection ports 131 to 134, which are not coupled to the connection pipes 111 to 114, respectively, are closed by the check valves 136, thereby blocking air inflow into the passage of the washing device 100.

Furthermore, one side of the circulation pipe 117 is coupled to the purified water pipe 22 of the outlet side of the filter unit 10 or the water level controller 22 of the purified water tank 21. The other side of the circulation pipe 117 is coupled to the circulation port 137 of the circulation module 120.

When the cocks 31 and 32 of the water treatment apparatus 1 are manually operated, the cocks 31 and 32 are opened by pressurizing the levers of the cocks 31 and 32. Here, there is no need to install the power supply cables 185.

Furthermore, when the cocks 31 and 32 of the water treatment apparatus 1 are opened or closed by the electromagnetic valves, the terminals of the power supply cables 185 at both ends thereof are connected to the connection terminals 51 of the water treatment apparatus 1 and the connection terminal 181 of the circulation module 120 (refer to FIG. 6). Here, the control unit 180 applies power to the connection terminals 51 of the water treatment apparatus through the power supply cables 185. As power is supplied to the connection terminals 51 of the water treatment apparatus, the cocks 31 and 32 of the water treatment apparatus are opened.

When the detergent inlet 121 and the counteragent inlet 122 are not provided in the washing device 100, detergent may be manually input after opening the purified water tank 21 of the water treatment apparatus 1. Furthermore, when the detergent inlet 121 is provided in the washing device 100, detergent may be automatically input through the detergent inlet 121.

Power is supplied to the washing device 100 by connecting the power cord 147 of the circulation module 120 to an external power source and manipulating the switch 148 of the circulation module 120.

A washing method of the water treatment apparatus having the above-described configuration according to the exemplary embodiment of the present invention and the operation thereof will now be described.

FIG. 7 is a flowchart illustrating a washing method of a washing device according to an exemplary embodiment of the present invention.

Referring to FIG. 7, the operating unit 150 of the circulation module 120 is manipulated to determine the number of cocks 31 and 32 and the number of drainpipes 33 and 34 to be connected. When the circulation wash button 151b or the batch wash button 151f is selected using the operating unit 150 of the washing device 100, the control unit 180 of the washing device 100 operates the opening/closing device 160, the circulation pump 173, the wash water detection unit 175, and the passage switching unit 171 of the circulation module 120. A wash mode is set in this manner (S11).

Here, when wash water is supplied to all the passages in the water treatment apparatus 1 at the same time, water pressure deviations of the wash water may locally occur according to the flow structures of the water treatment apparatus 1. That is, high water pressure of the wash water may be applied to some of the passages in the water treatment apparatus 1, while significantly lower water pressure of the wash water may be applied to the others. As such, when the wash water is supplied to all the passages in the water treatment apparatus at the same time, a dead zone, where washing is not performed due to the significantly lower water pressure of the wash water, may occur.

In order to prevent the generation of the dead zone, the wash water is flowed as follows.

The control unit 180 of the washing device 100 controls the opening/closing device 160 and sequentially opens groups into which the cocks 31 and 32 and the drainpipes 33 and 34 are divided with each group including at least one, so that the wash water sequentially flows through groups into which the passages inside the water treatment apparatus 1 are divided with each group including at least one passage.

A description will be made of a case in which the cold water tank 23, the drainpipe 33 of the cold water tank 23, the hot water tank 25, and the drainpipe 34 of the hot water tank 25 are washed in that order.

The control unit 180 of the washing device 100 opens the connection pipe 111 and the circulation pipe 117 (S12). That is, by operating the opening/closing device 160, the passage of the connection port 131 connected to the cold water/purified water cock 31 is opened, while the passages of the connection ports 132 to 134 are closed.

Furthermore, as the circulation pump 173 operates, the wash water in the purified water tank 21 and the cold water tank 23 is discharged through the cold water/purified water cock 31 (S14).

In addition, the control unit 180 of the washing device 100 switches the switching unit 171 into a circulation mode (S14). Here, the control unit 180 of the washing device 100 causes the switching unit 171 to open the circulation pipe 117 and close the wash water drainpipe 148.

The wash water in the cold water/purified water cock 31 flows into the water level controller 22 through the circulation pump 173, the wash water detection unit 175, the passage switching unit 171, and the circulation pipe 117. The wash water flowing into the water level controller 22 flows into the purified water tank 21 and the cold water tank 23.

During this process, the wash water detection unit 175 detects the water pressure or the flow of the wash water and transmits the measured water pressure or flow rate of the wash water to the control unit 180 of the washing device 100.

When it is determined that the water pressure or the flow rate of the wash water has not reached a predetermined value, the control unit 180 of the washing device 100 stops the operation of the circulation pump 173 and displays an error message and/or indicates an error message with an alarm using the display panel 153 and/or the buzzer 155 of the washing device 100. Otherwise, the circulation pump 173 keeps operating.

While the circulation of the wash water is performed for a predetermined time, the purified water tank 21, the cold water tank 23, some of the purified water pipes, the cold/purified water cock 31, and the water level controller 22 are washed.

Then, the control unit 180 of the washing device 100 operates the opening/closing device 160 to open the connection port 132 connected to the hot water cock 32 and close the other connection ports 131, 133, and 134. Here, the circulation pump 173 may be paused or keep operating while the opening/closing device 160 operates.

Then, the wash water in the hot water tank 25 is discharged through the hot water cock 32. The wash water in the hot water cock flows into the water level controller 22 through the circulation pump 173, the wash water detection unit 175, the passage switching unit 171, and the circulation pipe 117. The wash water, flowing into the water level controller 22, flows into the purified water tank 21 and the hot water tank 25.

As the wash water circulates through the purified water tank 21, the hot water tank 25 and the passage thereof, the hot water tank 25 and the passage thereof are washed.

Then, the control unit 180 of the washing device 100 operates the opening/closing device 160 to thereby open the connection port 133 connected to the drainpipe 33 of the cold water tank 23 and close the other connection ports 131, 132, and 134. As a result, the purified water tank 21, the cold water tank 23, and the drainpipe 33 of the cold water tank 23 are washed.

Furthermore, the control unit 180 of the washing device 100 operates the opening/closing device 160 to open the connection port 134 of the hot water tank 25 connected to the drainpipe 34 and close the other connection ports 131 to 133. As a result, the purified water tank 21, the hot water tank 25, and the drainpipe 34 of the hot water tank 25 are washed.

While the hot water tank 25 and the drainpipes 33 and 34 are being washed, the wash water detection unit 175 measures the water pressure or the flow rate of the wash water and transmits the measured water pressure or flow rate to the control unit 180 of the washing device 100. When the water pressure or the flow rate of the wash water has not reached a predetermined value, the control unit 180 stops the operation of the circulation pump 173 and may indicate an error message or an alarm.

As described above, in the washing device 100, the wash water flows through the purified water tank 21, the cold water tank 23, the hot water tank 25, the drainpipe 33 of the cold water tank 23, and the drainpipe 34 of the hot water tank 25 in a sequential manner, so that the water pressure deviation of the wash water may hardly occur in the passages through which the wash water flow. Therefore, it is possible to thoroughly wash the passages of the water treatment apparatus 1.

Furthermore, the washing device 100 can wash the cold water/purified water cock 31, the drainpipes 33 and 34, the water level controller 22, and the purified water pipes, which are hard to reach with hands or washing tools, as well as the tanks 21, 23, and 25, which can be reached by hands or washing tools.

Then, when the control unit 180 of the washing device 100 determines that circulation washing time has been reached (S15), the operation of the circulation pump 173 may be stopped (S16). Furthermore, a message or/and an alarm indicating the completion of washing may be given through the display panel 153 and/or the buzzer 155 of the operating unit 150.

The control unit 180 of the washing device 100 determines whether the counteragent into the purified water tank 21 or the washing device 100 has been completed or not (S17).

When it is determined that the input of the counteragent has been completed, the circulation pump 173 operates (S18). Here, the passage switching unit 171 opens the circulation pipe 117 and closes the wash water drainpipe 148, so that the wash water in the circulation pump 173 flows into the circulation pipe 117.

When neutralizing the wash water, the wash water may sequentially circulate through groups into which the plurality of passages of the water treatment apparatus are divided, with each group including at least one passage. That is, the wash water containing the counteragent may circulate sequentially through the cold water tank 23, the hot water tank 25, the drainpipe 33 of the cold water tank 23, and the drainpipe 34 of the hot water tank 25.

Therefore, when neutralizing the wash water, the detergent, attached to the tanks or the passages of the water treatment apparatus, can be uniformly neutralized by minimizing the water pressure difference occurring in the passages of the water treatment apparatus. Furthermore, even in a neutralization mode for the wash water, it is possible to remove a zone of the water treatment apparatus, where the wash water stagnates.

Furthermore, while the wash water is neutralized, the wash water detection unit 175 measures the water pressure or the flow rate of the wash water, and transmits the measured water pressure or the measured flow rate of the wash water to the control unit 180 of the washing device 100. When the water pressure or the flow rate of the wash water has not reached a predetermined value, the control unit 180 stops the operation of the circulation pump 173 or may send an error message and/or an alarm.

When the control unit 180 of the washing device 100 determines that the predetermined neutralization time has been reached (S19), the passage switching unit 171 is switched into a drain mode (S20). Here, the passage switching unit 171 keeps closing the circulation pipe 117 and opening the wash water drainpipe 148.

Therefore, after the wash water in the water treatment apparatus 1 is sufficiently neutralized by the counteragent, the neutralized wash water is discharged through the wash water drainpipe 148. Here, the circulation pump 173 keeps operating.

Furthermore, the control unit 180 of the washing device 100 may indicate that the neutralization mode has been completed through a display and/or an alarm.

The control unit 180 of the washing device 100 determines whether the drain mode has been completed or not (S21). Here, the control unit 180 of the washing device 100 determines whether the drain mode has been completed or not by integrating time during which the passage switching unit 171 is switched into the drain mode or by measuring the water pressure and the flow rate detected by the wash water detection unit 175.

When it is determined that the drain mode has been completed, the control unit 180 of the washing device 100 indicates the completion of the drain mode through a display and/or alarm. Furthermore, the operation of the circulation pump 173 is stopped (S22).

Then, fresh water is supplied to the water treatment apparatus 1 (S23). That is, the user or the control unit 180 of the washing device 100 may cause water to flow into the purified water tank 21 through the water pipe.

Here, the control unit 180 of the washing device 100 fills the purified water tank 21 with fresh water. When the purified water tank 21 is filled with water, the control unit 180 stops supplying water to the water treatment apparatus 1.

After the purified water tank 21 is filled with water, the drain is paused for a predetermined time, so that the counteragent or the detergent remaining in the purified water tank 21 can be sufficiently cleaned.

After the purified water tank 21 is filled with water, and the predetermined time has passed, the water in the purified water tank 21 is drained off. The washing device 100 determines the completion of the wash mode by determining whether the water in the purified water tank 21 has been completely drained off.

When it is determined that the wash mode has been completed (S24), the control unit of the washing device 100 indicates that the wash mode has been completed through an alarm or the display of the operating unit 150.

As described above, the washing device washes groups into which passages of the water treatment apparatus are divided with each group including at least one passage, neutralizes wash water, and cleans the remaining detergent or counteragent. Therefore, the user can drink clean water after the washing operation of the washing device.

As set forth above, according to exemplary embodiments of the invention, hard to reach areas with hands or washing tools inside a water treatment apparatus can also be washed to thus suggest significant industrial applicability.

What is claimed is:

1. A washing method of a water treatment apparatus, the washing method comprising:
   a wash water inflow operation in which wash water flows into circulation members; and
   a circulation washing operation in which a circulation module circulates the wash water through a plurality of passages of the water treatment apparatus,
   wherein the plurality of passages of the water treatment apparatus are divided into groups, and the wash water circulates through the groups in a sequential manner to thereby wash the plurality of passages in the wash water inflow operation.

2. The washing method of claim 1, wherein a plurality of tanks of the water treatment apparatus are divided into groups comprising at least one tank, and the wash water circulates through the groups in a sequential manner to thereby wash the plurality of tanks in the wash water inflow operation.

3. The washing method of claim 1, wherein the circulation module is operated before a purified water storage unit at an outlet side of a filter unit is fully filled with water in the circulation washing operation.

4. The washing method of claim 1, wherein the circulation module stops operating when the circulation washing operation is completed or a malfunction is detected in the circulation washing operation.

5. A washing method of a water treatment apparatus, the washing method comprising:
   a wash water inflow operation in which wash water flows into circulation members;
   a circulation washing operation in which a circulation module circulates the wash water through a plurality of passages of the water treatment apparatus, and
   a wash water neutralization operation in which the wash water is neutralized by inputting a counteragent into the wash water after the circulation washing operation.

6. The washing method of claim 5, wherein the plurality of passages of the water treatment apparatus are divided into groups, and the wash water circulates through the groups in a sequential manner to thereby wash the plurality of passages in the wash water neutralization operation.

7. The washing method of claim 5, further comprising a draining operation in which neutralized wash water is drained by operating a passage switching unit after the wash water neutralization operation is performed for a predetermined period of time.

8. The washing method of claim 7, further comprising a cleaning operation in which the plurality of passages of the water treatment apparatus are cleaned by supplying purified water to the plurality of passages of the water treatment apparatus and draining the purified water after the draining operation is performed.

9. The washing method of claim 8, wherein the passage switching unit is operated after completely filling a purified water storage unit at an outlet side of a filter unit with the purified water to thereby drain the purified water in the purified water storage unit outside of the cleaning operation.

* * * * *